US009933509B2

(12) United States Patent
Hill et al.

(10) Patent No.: US 9,933,509 B2
(45) Date of Patent: Apr. 3, 2018

(54) SYSTEM FOR TRACKING AN OBJECT USING PULSED FREQUENCY HOPPING (71) Applicant: Position Imaging, Inc., Portsmouth, NH (US)

(72) Inventors: Edward L. Hill, Portsmouth, NH (US); Guohua Min, Exeter, NH (US); Harry Lee Deffebach, III, Melbourne Beach, FL (US)

(73) Assignee: POSITION IMAGING, INC., Portsmouth, NH (US)

(*) Notice: Subject to any disclaimer, the term of this patent is extended or adjusted under 35 U.S.C. 154(b) by 575 days.

(21) Appl. No.: 14/568,390

(22) Filed: Dec. 12, 2014

(65) Prior Publication Data
US 2015/0097732 A1    Apr. 9, 2015

Related U.S. Application Data (63) Continuation-in-part of application No. 14/354,833, filed as application No. PCT/US2012/064860 on Nov. 13, 2012.
(Continued)

(51) Int. Cl.
G01S 3/02      (2006.01)
G01S 5/06      (2006.01)
G01S 5/02      (2010.01)

(52) U.S. Cl.
CPC ............. G01S 5/06 (2013.01); G01S 5/0215 (2013.01); G01S 5/0221 (2013.01); G01S 5/0294 (2013.01)

(58) Field of Classification Search
CPC ........ G01S 5/0294; G01S 5/06; G01S 5/0221; G01S 5/0215
(Continued)

(56) References Cited

U.S. PATENT DOCUMENTS 3,824,596 A    7/1974  Guion et al.
3,940,700 A    2/1976  Fischer
(Continued)

OTHER PUBLICATIONS

Restriction Requirement in related U.S. Appl. No. 14/354,833, dated Dec. 12, 2016; 6 pages.
(Continued)

Primary Examiner — Chuong P Nguyen
(74) Attorney, Agent, or Firm — Lando & Anastasi, LLP (57) ABSTRACT Tracking systems and methods for obtaining position coordinates of transmitters are provided. One or more transmitters send multiple carrier signals to multiple receivers, where the time difference of arrival of the multiple carrier signals are used to determine the location of each transmitter. Accuracy is obtained by using phase information of multiple carrier frequencies for time difference of arrival measurements. The accuracy obtained by a receiver depends on the quality of the received carrier signal; a received carrier signal may become distorted by the presence of multipath interference. By using multiple signals with different frequencies, the system can screen or compensate for multipath effects. This screening can be accomplished either through various signal-sampling techniques or by averaging the signals received at the receiver. Because signals with different frequencies have different multipath experiences, a computer can analyze and compensate for "good" and "bad" signals.

14 Claims, 5 Drawing Sheets

Related U.S. Application Data (60) Provisional application No. 61/915,639, filed on Dec. 13, 2013, provisional application No. 61/558,032, filed on Nov. 10, 2011, provisional application No. 61/558,082, filed on Nov. 10, 2011.

(58) Field of Classification Search
USPC .......................................... 342/465, 450, 451
See application file for complete search history.

(56) References Cited

U.S. PATENT DOCUMENTS

| | | | |
|---|---|---|---|
| 4,328,499 A | 5/1982 | Anderson et al. | |
| 5,010,343 A | 4/1991 | Andersson | |
| 5,426,438 A | 6/1995 | Peavey et al. | |
| 5,510,800 A * | 4/1996 | McEwan | G01F 23/284 |
| | | | 342/386 |
| 5,574,468 A | 11/1996 | Rose | |
| 5,592,180 A | 1/1997 | Yokev et al. | |
| 5,600,330 A | 2/1997 | Blood | |
| 5,657,026 A | 8/1997 | Culpepper et al. | |
| 5,923,286 A | 7/1999 | Divakaruni | |
| 5,953,683 A | 9/1999 | Hansen et al. | |
| 6,167,347 A | 12/2000 | Lin | |
| 6,255,991 B1 | 7/2001 | Hedin | |
| 6,292,750 B1 | 9/2001 | Lin | |
| 6,409,687 B1 | 6/2002 | Foxlin | |
| 6,412,748 B1 | 7/2002 | Girard | |
| 6,417,802 B1 | 7/2002 | Diesel | |
| 6,496,778 B1 | 12/2002 | Lin | |
| 6,593,885 B2 | 7/2003 | Wisherd et al. | |
| 6,630,904 B2 | 10/2003 | Gustafson et al. | |
| 6,683,568 B1 | 1/2004 | James et al. | |
| 6,697,736 B2 | 2/2004 | Lin | |
| 6,721,657 B2 | 4/2004 | Ford et al. | |
| 6,750,816 B1 | 6/2004 | Kunysz | |
| 6,861,982 B2 * | 3/2005 | Forstrom | G01C 21/206 |
| | | | 342/387 |
| 6,989,789 B2 | 1/2006 | Ferreol et al. | |
| 7,009,561 B2 | 3/2006 | Menache | |
| 7,143,004 B2 | 11/2006 | Townsend et al. | |
| 7,190,309 B2 | 3/2007 | Hill | |
| 7,193,559 B2 | 3/2007 | Ford et al. | |
| 7,236,092 B1 | 6/2007 | Kiang et al. | |
| 7,292,189 B2 * | 11/2007 | Orr | G01S 5/0215 |
| | | | 342/387 |
| 7,295,925 B2 | 11/2007 | Breed et al. | |
| 7,409,290 B2 | 8/2008 | Lin | |
| 7,443,342 B2 | 10/2008 | Shirai et al. | |
| 7,499,711 B2 * | 3/2009 | Hoctor | G01S 5/06 |
| | | | 455/404.2 |
| 7,533,569 B2 | 5/2009 | Sheynblat | |
| 7,612,715 B2 | 7/2009 | Macleod | |
| 7,646,330 B2 | 1/2010 | Karr | |
| 7,876,268 B2 | 1/2011 | Jacobs | |
| 8,269,624 B2 | 9/2012 | Chen et al. | |
| 8,457,655 B2 | 6/2013 | Zhang et al. | |
| 8,749,433 B2 | 6/2014 | Hill | |
| 8,957,812 B1 | 2/2015 | Hill et al. | |
| 9,063,215 B2 * | 6/2015 | Perthold | G01S 5/021 |
| 9,482,741 B1 * | 11/2016 | Min | G01S 5/0289 |
| 2002/0021277 A1 | 2/2002 | Kramer | |
| 2003/0053492 A1 | 3/2003 | Matsunaga | |
| 2003/0120425 A1 | 6/2003 | Stanley et al. | |
| 2003/0195017 A1 | 10/2003 | Chen et al. | |
| 2004/0095907 A1 | 5/2004 | Agee et al. | |
| 2004/0176102 A1 | 9/2004 | Lawrence et al. | |
| 2005/0143916 A1 | 6/2005 | Kim et al. | |
| 2005/0184907 A1 | 8/2005 | Hall | |
| 2005/0275626 A1 | 12/2005 | Mueller et al. | |
| 2006/0013070 A1 | 1/2006 | Holm et al. | |
| 2006/0061469 A1 | 3/2006 | Jaeger | |
| 2006/0066485 A1 * | 3/2006 | Min | G01S 5/06 |
| | | | 342/465 |
| 2006/0101497 A1 | 5/2006 | Hirt | |
| 2007/0060384 A1 | 3/2007 | Dohta | |
| 2008/0048913 A1 | 2/2008 | Macias et al. | |
| 2008/0204322 A1 | 8/2008 | Oswald et al. | |
| 2008/0316324 A1 | 12/2008 | Rofougaran | |
| 2009/0149202 A1 | 6/2009 | Hill et al. | |
| 2009/0243932 A1 | 10/2009 | Moshfeghi | |
| 2010/0103173 A1 | 4/2010 | Lee | |
| 2010/0103989 A1 | 4/2010 | Smith et al. | |
| 2010/0123664 A1 | 5/2010 | Shin | |
| 2011/0006774 A1 | 1/2011 | Balden | |
| 2011/0187600 A1 | 8/2011 | Landt | |
| 2011/0208481 A1 * | 8/2011 | Slastion | G01S 3/74 |
| | | | 702/189 |
| 2011/0210843 A1 | 9/2011 | Kummetz | |
| 2011/0241942 A1 * | 10/2011 | Hill | G01S 5/0205 |
| | | | 342/451 |
| 2011/0256882 A1 | 10/2011 | Markhovsky | |
| 2012/0013509 A1 * | 1/2012 | Wisherd | G01S 5/0221 |
| | | | 342/451 |
| 2012/0127088 A1 | 5/2012 | Pance et al. | |
| 2012/0184285 A1 | 7/2012 | Sampath | |
| 2013/0021417 A1 | 1/2013 | Miho et al. | |
| 2013/0036043 A1 | 2/2013 | Faith | |
| 2013/0314210 A1 | 11/2013 | Schoner | |
| 2015/0169916 A1 * | 6/2015 | Hill | G01S 5/06 |
| | | | 340/10.1 |
| 2015/0323643 A1 * | 11/2015 | Hill | G01S 5/06 |
| | | | 370/252 |
| 2016/0256100 A1 | 9/2016 | Jacofsky et al. | |
| 2016/0370453 A1 * | 12/2016 | Boker | G01S 5/06 |
| 2016/0371574 A1 | 12/2016 | Nguyen et al. | |

OTHER PUBLICATIONS

"ADXL202/ADXL210 Product Sheet," Analog Devices, Inc., Analog.com, 1999; 11 pages.

Non-Final Office Action in related U.S. Appl. No. 14/354,833, dated Apr. 18, 2017; 6 pages.

Pourhomayoun, Mohammad and Mark Fowler, "Improving WLAN-based Indoor Mobile Positioning Using Sparsity," Conference Record of the Forty Sixth Asilomar Conference on Signals, Systems and Computers, Nov. 4-7, 2012, pp. 1393-1396, Pacific Grove, California.

Proakis, John G. and Masoud Salehi, "Communication Systems Engineering", Second Edition, Prentice-Hall, Inc., Upper Saddle River, New Jersey, 2002; 815 pages.

Schmidt & Phillips, "INS/GPS Integration Architectures", NATO RTO Lecture Seriers, First Presented Oct. 20-21, 2003; 24 pages.

Farrell & Barth, "The Global Positiong System & Interial Navigation", 1999, McGraw-Hill; pp. 245-252.

Grewal & Andrews, "Global Positioning Systems, Inertial Nagivation, and Integration", 2001, John Weiley and Sons, pp. 252-256.

Jianchen Gao, "Development of a Precise GPS/INS/On-Board Vehicle Sensors Integrated Vehicular Positioning System", Jun. 2007, UCGE Reports No. 20555; 245 pages.

Yong Yang, "Tightly Coupled MEMS INS/GPS Integration with INS Aided Receiver Tracking Loops", Jun. 2008, UCGE Reports No. 20270; 205 pages.

Goodall, Christopher L., "Improving Usability of Low-Cost INS/GPS Navigation Systems using Intelligent Techniques", Jan. 2009, UCGE Reports No. 20276; 234 pages.

Debo Sun, "Ultra-Tight GPS/Reduced IMU for Land Vehicle Navigation", Mar. 2010, UCGE Reports No. 20305; 254 pages.

Sun, et al., "Analysis of the Kalman Filter With Different INS Error Models for GPS/INS Integration in Aerial Remote Sensing Applications", Bejing, 2008, The International Archives of the Photogrammerty, Remote Sensing and Spatial Information Sciences vol. XXXVII, Part B5.; 8 pages.

Adrian Schumacher, "Integration of a GPS aised Strapdown Inertial Navigation System for Land Vehicles", Master of Science Thesis, KTH Electrical Engineering, 2006; 67 pages.

Vikas Numar N., "Integration of Inertial Navigation System and Global Positioning System Using Kalman Filtering", M.Tech Dissertation, Indian Institute of Technology, Bombay, Mumbai, Jul. 2004; 69 pages.

(56) References Cited

OTHER PUBLICATIONS

Jennifer Denise Gautier, "GPS/INS Generalized Evaluation Tool (GIGET) for the Design and Testing of Integrated Navigation Systems", Dissertation, Stanford University, Jun. 2003; 160 pages.
Farrell, et al., "Real-Time Differential Carrier Phase GPS=Aided INS", Jul. 2000, IEEE Transactions on Control Systems Technology, vol. 8, No. 4; 13 pages.
Filho, et al., "Integrated GPS/INS Navigation System Based on a Gyrpscope-Free IMU", DINCON Brazilian Conference on Synamics, Control, and Their Applications, May 22-26, 2006; 6 pages.
Santiago Alban, "Design and Performance of a Robust GPS/INS Attitude System for Automobile Applications", Dissertation, Stanford University, Jun. 2004; 218 pages.
International Search Report and Written Opinion in related International Patent Application No. PCT/US12/64860, dated Feb. 28, 2013; 8 pages.
International Preliminary Report on Patentability in counterpart international patent application No. PCT/US12/64860, dated May 22, 2014; 7 pages.
U.S. Appl. No. 13/918,295, filed Jun. 14, 2013, entitled, "RF Tracking with Active Sensory Feedback"; 31 pages.

\* cited by examiner

SYSTEM FOR TRACKING AN OBJECT USING PULSED FREQUENCY HOPPING

RELATED APPLICATIONS

This application is a continuation-in part of co-pending U.S. patent application Ser. No. 14/354,833, filed Apr. 28, 2014, titled "Systems and Methods of Wireless Position Tracking," which is a National Stage Entry of International application no. PCT/US2012/064860, filed Nov. 13, 2012, which claims priority to U.S. provisional application Nos. 61/558,032 and 61/558,082, both filed on Nov. 10, 2011, the entireties of which U.S., International, and provisional applications are incorporated by reference herein. This application also claims the benefit of and priority to U.S. provisional application No. 61/915,639, filed Dec. 13, 2013, titled "System for Tracking an Object using Pulsed Multiple Frequencies," the entirety of which provisional application is incorporated by reference herein.

FIELD OF THE INVENTION

The invention relates generally to systems and methods for tracking the position of electromagnetic signal transmitting devices, particularly in an environment with interference.

BACKGROUND

Radio frequency (RF) signals propagate through the air predictably. However, when physical structures are present, such structures may absorb or reflect the RF signals. In these situations, signal degradation or multipath issues may occur (multipath is generally described as an RF signal reaching an antenna over two or more distinct paths).

U.S. Pat. No. 8,749,433, granted Jun. 10, 2014, titled "Multiplexing Receiver System", the entirety of which is incorporated by reference herein, discloses a system for tracking mobile RF transmitters, wherein RF receivers receive RF signals transmitted from a mobile RF transmitter. Based on the phase of the RF signal as received at multiple receiver antennae, the distance between the receiver antennae and the transmitter is calculated along a line. With multiple appropriately spaced antennae, the location of the RF transmitter can be calculated and the position of the mobile RF transmitter may be tracked.

In such a system, while the data sent in the RF signal is important, the integrity of receiving the correct signal is imperative. Thus, if an object (a person) is disposed between the RF transmitter and an antenna and impedes the signal, the transmitter cannot be tracked as the signal may not be received. Also, the signal being utilized to track the transmitter must be the "straight line" signal from the transmitter and not a multipath signal as created by signal reflection from a surface.

SUMMARY

In terrestrial communication, a transmitted RF signal is reflected and refracted by a variety of smooth and rough terrains, that is, multipath propagation. The propagation characteristics will vary with each individual carrier frequency. As described herein, multiple frequencies (frequency hopping/spread spectrum) are used to screen multipath effects on the carrier signal phase.

The direct and indirect signals (of same frequency) interfere at the antenna center and may be represented by:

$$\text{direct signal: } y_d = \alpha * \cos(\varphi) \quad \text{(Eq. 1)}$$

$$\text{indirect signal: } y_m = \beta * \alpha * \cos(\varphi + \Delta\varphi) \quad \text{(Eq. 2)}$$

where $\alpha$ and $\varphi = 2\pi f t$ denote the amplitude and the phase of the direct signal. The amplitude of the indirect signal is reduced by the damping factor $\beta$ because of the reflection at a surface ($\beta \leq 1$). The phase of the indirect signal is delayed by the phase shift $\Delta\varphi = 2\pi f \Delta t$ that is dependent on the multipath effect and the frequency. The received signal at receiver antenna is represented as:

$$y = y_d + y_m \quad \text{(Eq. 3)}$$

$$= \alpha * \cos(\varphi) + \beta * \alpha * \cos(\varphi + \Delta\varphi)$$

Applying the cosine theorem, the combination signal is:

$$y = \beta_m * \alpha * \cos(\varphi + \Delta\varphi_m) \quad \text{(Eq. 4)}$$

where $$\beta_m = \sqrt{1 + \beta^2 - 2*\beta*\cos(\Delta\varphi)} \quad \text{(Eq. 5)}$$

and $$\Delta\varphi_m = \arctan(\beta*\sin(\Delta\varphi)/(1+\beta*\cos(\Delta\varphi))). \quad \text{(Eq. 6)}$$

The damping factor $\beta$ may vary between 0 and 1. The substitution of $\beta=0$ (i.e., there is no reflected signal and no multipath) gives $\beta_m=1$ and $\Delta\varphi_m=0$. This means that the combination signal is identical to the direct signal. The strongest possible reflection is defined by $\beta=1$. The substitution of this value produces:

$$\beta_m = 2 * \sin\left(\frac{\Delta\varphi}{2}\right) \quad \text{(Eq. 7)}$$

$$\Delta\varphi_m = \frac{\Delta\varphi}{2}. \quad \text{(Eq. 8)}$$

The above equations indicate that signal integrity is directly controlled, to some degree, by signal phase. Free space loss is signal attenuation in air, with it being known that higher frequency signals attenuate more rapidly than lower frequency signals in air. However, one tradeoff for lower frequency is a larger antenna. Further, different frequency signals have varying signal impediments (multipath interference, resonance, local interference, attenuation, etc.) in different environments.

In one embodiment, a range of frequencies is chosen for operation of the RF transmitter, and the transmitter and receiver make coordinated frequency hops. One advantage of such a system is that if a certain channel produces data that does not fit the expected track of the RF transmitter, the "bad" data from that channel can be ignored and the visual representation of the track can be smoothed. Further, the system may elect to screen (or skip) that channel in future frequency hopping to avoid the interference and resulting bad data.

All examples and features mentioned below can be combined in any technically possible way.

In one aspect, a system is provided for tracking a position of a transmitter whose position is to be determined. The transmitter is capable of processing electromagnetic signals and of transmitting frequency-hopping electromagnetic signals. The system comprises at least three receiver antennae capable of receiving the frequency-hopping electromagnetic signals transmitted by the transmitter. A central controller is in communication with the at least three receiver antennae to acquire the frequency-hopping electromagnetic signals from the least three receiver antennae and to compute phase differences based on these frequency-hopping electromagnetic signals. The central controller further calculates the position of the transmitter based on these computed phase differences.

In another aspect, a system is provided for tracking a position of a transmitter whose position is to be determined. The transmitter is capable of processing electromagnetic signals and of transmitting frequency-hopping electromagnetic signals. The system comprises at least three receiver antennae capable of receiving the frequency-hopping electromagnetic signals transmitted by the transmitter. A central controller is in communication with the at least three receiver antennae to acquire the frequency-hopping electromagnetic signals from the least three receiver antennae and to compute phase differences based on these frequency-hopping electromagnetic signals. The central controller i) calculates the position of the transmitter based on these computed phase differences, and ii) performs a calibration routine that steps through frequencies with the transmitter whereby phase integrity of the electromagnetic signals is calibrated at a plurality of frequencies, and wherein the central controller and the transmitter use frequencies within an acceptable range, as determined by phase relationships of the plurality of frequencies, for position tracking calculations.

In still another aspect, a method for setting up a system for tracking an RF transmitter comprising placing the RF transmitter in a fixed location, placing at least two receiver antennae in locations within RF signal range of the RF transmitter. The at least two receiver antennae are in communication with a CPU. Communication is established on a first frequency between the RF transmitter and at least one of the at least two receiver antennae. A position of the RF transmitter is calculated relative to the at least one receiver antenna using phase data of signals transmitted by the RF transmitter. The method further comprises frequency hopping to at least one other frequency, calculating the position of the RF transmitter using the phase data of the signals transmitted by the RF transmitter relative to the at least one receiver antenna, and determining if the calculated positions of the RF transmitter based on the multiple frequencies is acceptable for determining a present position of the RF transmitter.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
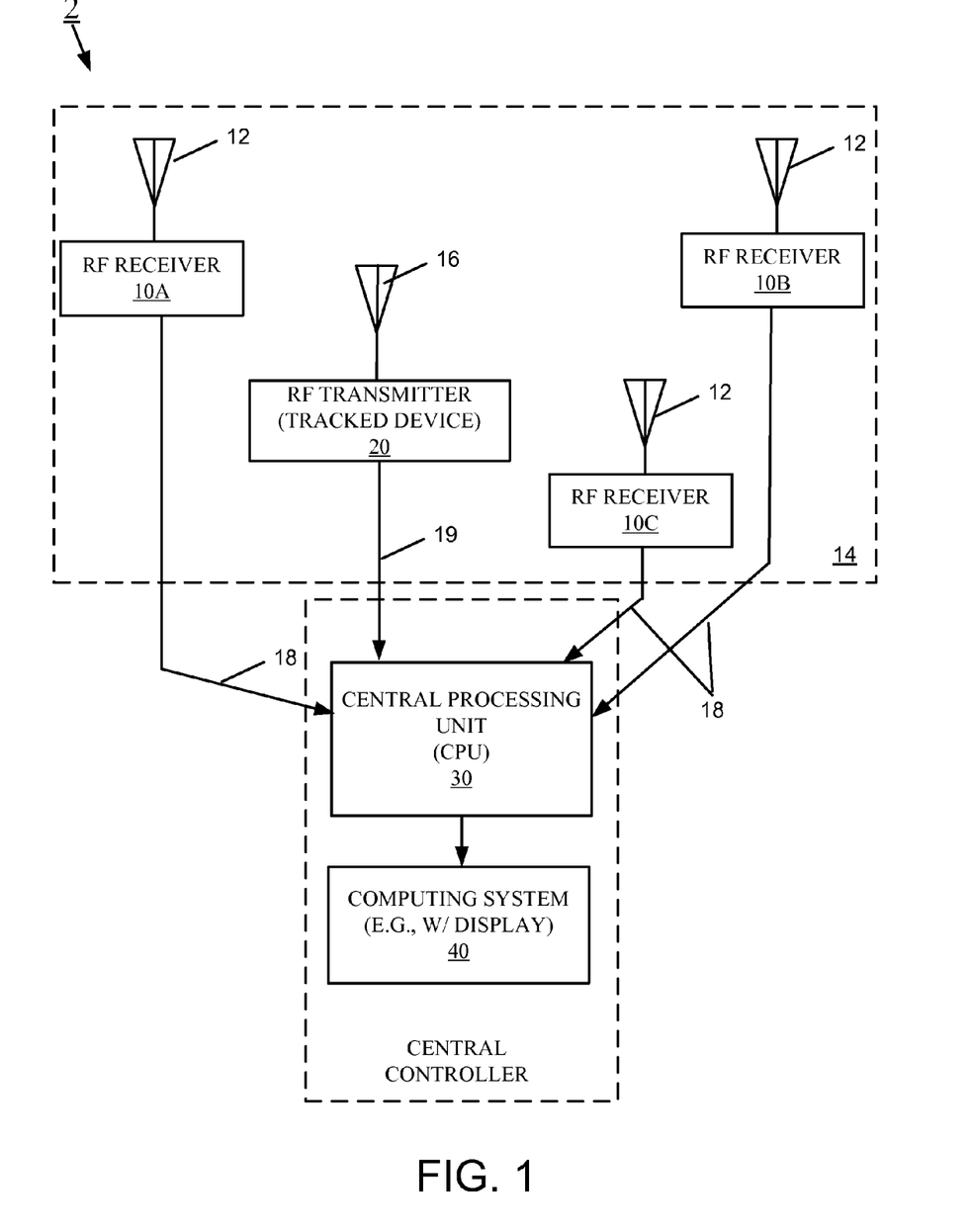
FIG. 1 is a block diagram of an embodiment of a tracking system for tracking position of an RF transmitter.

Position tracking systems described herein use phase detection techniques to track position of an object having a radio frequency (RF) transmitter. FIG. 1 shows an embodiment of a tracking system 2 including a plurality of receivers 10a, 10b, and 10c (generally, receiver 10), an electromagnetic signal transmitter 20, a central processing unit 30 for processing received microwave or RF signals, and a computer system 40, which includes an interface circuit (not shown) to calculate the coordinates of the object. The transmitter 20 may be carried by, attached to, or embedded in an object whose position (x, y, z) is to be dynamically determined. The transmitter 20 can be embodied in such objects as a mobile cell phone, television or game controller, a tablet or laptop, etc. Although shown separately, the central processing unit 30 and computer system 40 and/or the receivers 10 can be integrated into a single machine. A single machine comprised of the central processing unit 30 and computer 40 may be referred to herein as a central controller.

Each of the receivers 10a, 10b, and 10c includes at least one antenna 12, a band pass filter (not shown) and a low noise amplifier (LNA) (not shown). The position (X, Y, Z) of each receiver antenna 22 is known. The antennae 22 are disposed within range of the signal being transmitted by the transmitter 20. The receivers 10 form a receiver network 14, and the object carrying the transmitter 20 works within the physical receiver network (i.e., within range of the receivers 10). Coordinates of each phase center of the one or more antennae of each receiver 10 are predetermined and used as coordinate reference for correlating the coordinate location of the transmitter 20 within the receiver network 14. The transmitter 20 includes at least one antenna 16 for transmitting electromagnetic signals (e.g., microwave, radio frequency). Also, the phase center of the one or more antennae 16 of the transmitter 20 is used as a reference for the coordinates of the transmitter. Although three receivers 10 are shown, the principles described herein may be practiced by as few as two receivers 10 (or receiver antennae).

The central processing unit 30 is in communication with each of the receiver antennae 10 over communication links 18. Such communication links 18 can be wired (e.g., cables) or wireless.

During operation of the tracking system 2, the transmitter 20 associated with the object continuously transmits a pulsed frequency-hopping electromagnetic signal. The receivers 10a, 10b, and 10c receive and amplify the traveled frequency-hopping signal. Each receiver 10 then sends its amplified frequency-hopping signal to the central processing unit 30 over its communication link 18. Alternatively, the receivers 10a, 10b, and 10c can send the signals to the central processing unit 30 wirelessly.

From the received amplified frequency-hopping signal, the central processing unit 30 detects the carrier signals. Phase discriminators (FIG. 4) of the CPU 30 determine carrier phase differences between each carrier signal and a reference signal (received from the transmitter 20 over the communication link 19). The central processing unit 30 also includes analog-to-digital converter (FIG. 4) to digitize the carrier phase differences.

The computer system 40 is in communication with the central processing unit 30 to acquire and convert the digital data representing the phase differences into time differences of arrival of the multiple frequencies used for the frequency-hopping signal. From these time differences of arrival, the computer system 40 calculates the coordinates (i.e., the (x, y, z) position) of the transmitter antenna 16. One of ordinary skill will recognize that if you have three straight-line signals from the transmitter 20 to three antenna 10a, 10b and 10c, calculating the intersection of the three straight lines gives a precise location of the transmitter 20. The computer system 40 can display the calculated position on a computer screen (e.g., as a cursor or a track), or provide the transmitter position to an application program for further use.

Figure 2:
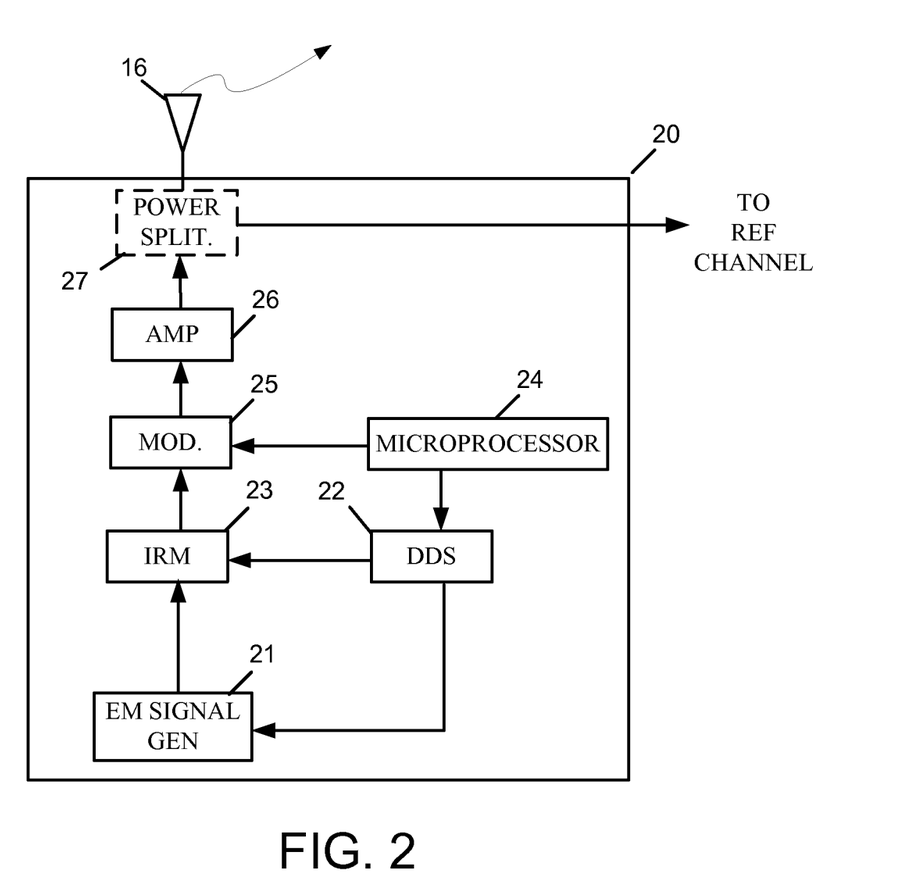
FIG. 2 is a block diagram of the RF transmitter carried by, disposed on, or embedded in a stationary or moving object within range of the tracking system.

FIG. 2 shows an embodiment of the transmitter 20 associated with the object. The transmitter 20 includes the antenna 16, an electromagnetic (EM) signal generator 21, a Direct Digital Synthesis (DDS) signal source 22, an Image Rejection Mixer (IRM) 23, a microprocessor unit 24, a pulse modulator 25, a power amplifier 26, and a power divider 27 (for wired reference channel embodiments).

During operation, the EM generator 21 generates a electromagnetic (RF or microwave) signal that depends on the signal frequency produced by the DDS signal source 22. Any frequency can be chosen depending on the required resolution of the coordinates of the transmitter position (e.g., the higher the frequency, the higher the resolution, but also the greater the signal attenuation and susceptibility to multipath issues). The DDS signal frequency depends on information received from and controlled by the microprocessor 24. The generated electromagnetic signal is synchronized to the same crystal signal for the microprocessor 24. The electromagnetic signal may be continuous or transmit only while tracking is desired.

Figure 3:
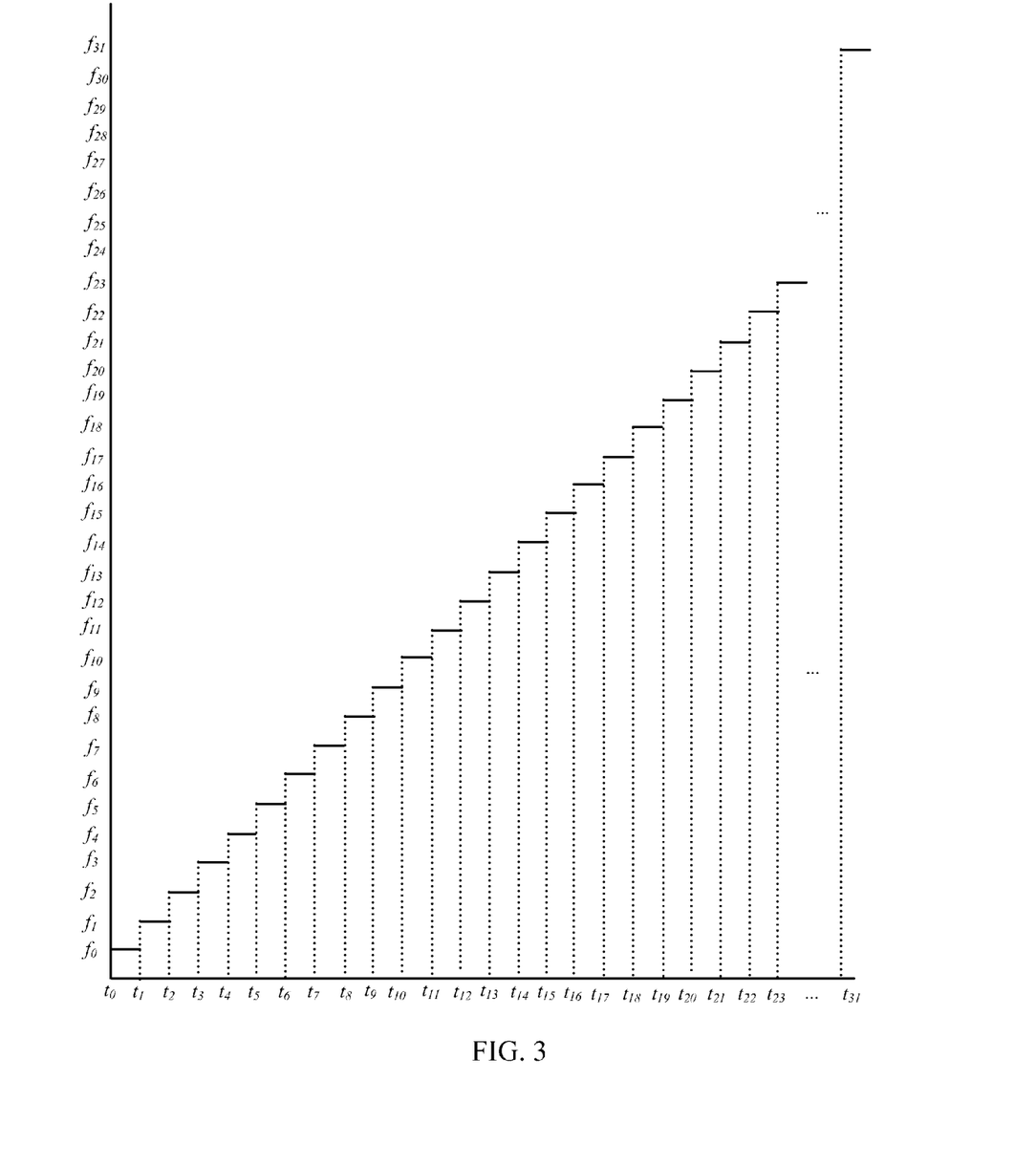
FIG. 3 is a graph of a simple example of a frequency-hopping time pattern.

The DDS signal source 22 generates fast, stable multiple frequencies. FIG. 3 shows an example output of the DDS signal source 22 over different time slots. This particular output is for illustration purposes only; any sequence of the output of the DDS signal source 22 can be randomly chosen. This DDS signal works as a reference clock for the IRM 23 to generate different frequencies for hopping.

Referring back to FIG. 2, the IRM 23 mixes the DDS frequencies to the electromagnetic frequency to complete the fast frequency hopping function. The benefit of using the IRM 23 is that a filter may be omitted. Further, other techniques for transmitting (and receiving, in the case of receivers 10a, 10b and 10c) a frequency-hopping electromagnetic signal apply to the principles described herein. The pulse modulator 25 can be a switch controlled by the pulse signal generated by the microprocessor 24 synchronized to the system crystal. This pulsed electromagnetic signal is amplified by the power amplifier 26 and transmitted from the antenna 16. If the transmitter 20 is wired, the power splitter 27 is used for a wired carrier phase reference. One path of the power splitter 27 is transmitted by the antenna 16, and one path is used as a carrier phase reference to the central processing unit 30. For a wireless embodiment, the power splitter 27 may not be used.

Figure 4:
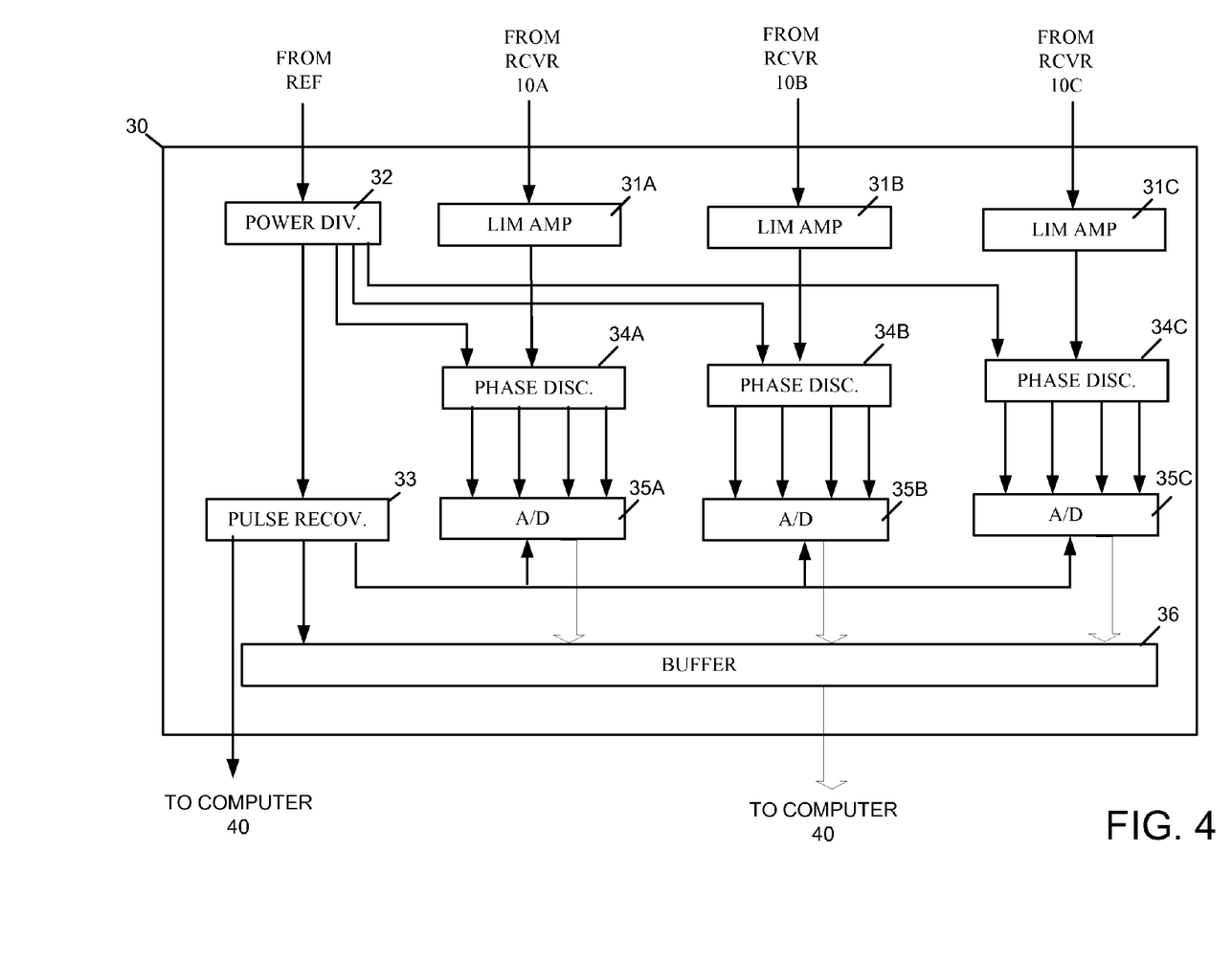
FIG. 4 is a block diagram of an embodiment of a central processing unit in the tracking system using a wired carrier phase reference.
Figure 5:
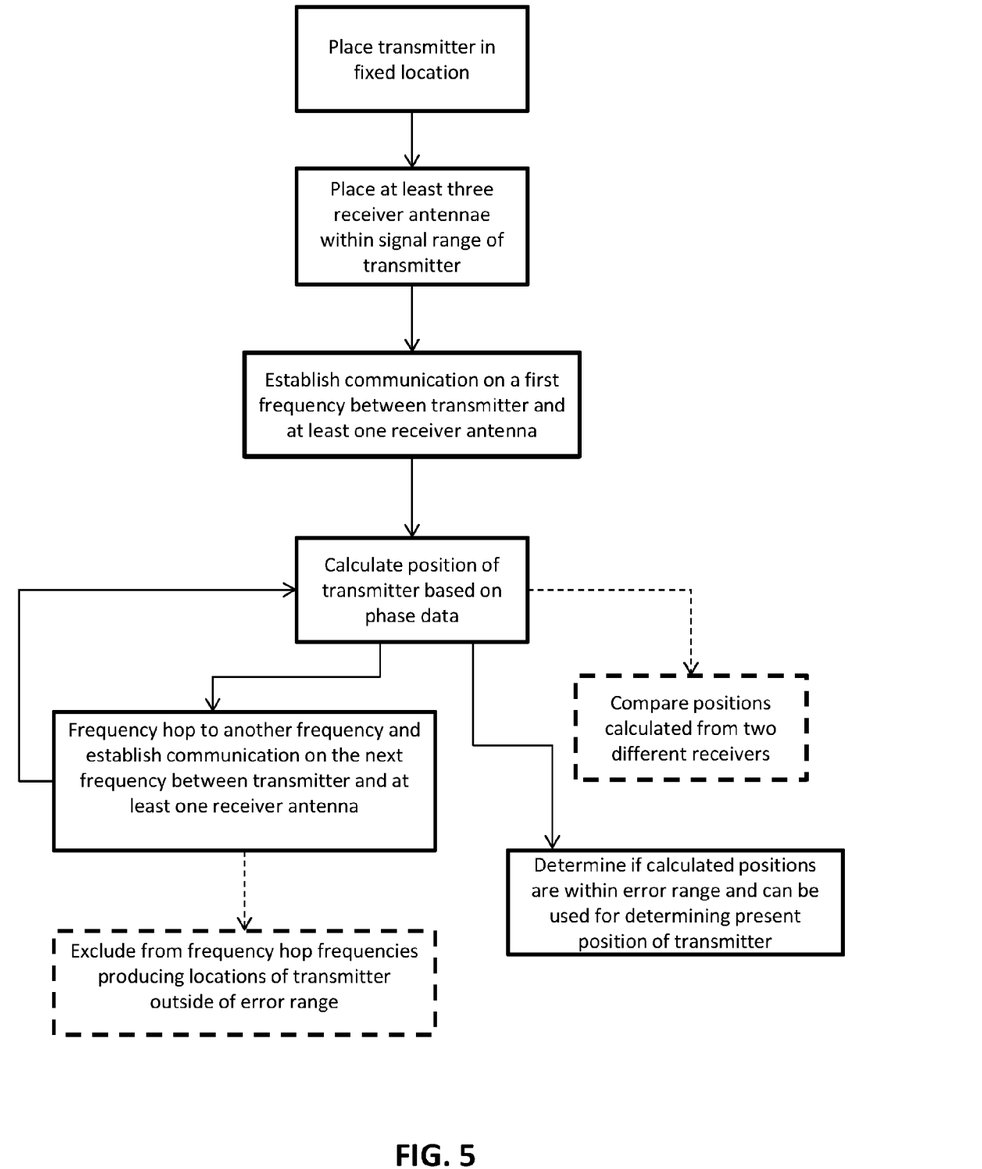
FIG. 5 illustrates a process that can be accomplished with an embodiment of the tracking system of the disclosure.

FIG. 4 shows an embodiment of the central processing unit 30, which provides the carrier phase differences to the computer 40. In one embodiment, the CPU 30 includes limiting amplifiers 31a, 31b, and 31c (generally, limiting amplifier 31), power dividers 32, a pulse recovery and appropriate pulse generator circuit 33, phase discriminators 34a, 34b, and 34c (generally, phase discriminator 34), A/D converters 35a, 35b, 35c (generally, A/D converter 35), and a data buffer 36.

Each limiting amplifier 31 limits the amplitude of the pulsed electromagnetic signal coupled from the receivers 10 so that the output of each phase discriminator 34 is just dependent on the carrier phase differences. The power dividers 32 divide the input reference signal to four paths for phase discriminating. The phase discriminators 34 are used to discriminate phase differences of hopped frequencies. The A/D converters 35 are used to convert the carrier phase difference from analog to digital format. The buffer 36 functions as storage space to store the digital data for the computer 40. All the control signals for the A/D converters 35 and buffer 36 come from the pulse recovery circuit 33. Also, the pulse recovery circuit 33 provides the handshake signal with the computer 40. Other circuitry and techniques for determining the carrier phase differences based on time of arrival information may be used in connection with the principles described herein.

The data collected from the buffer 36 contain the phase differences of the different hopped frequencies. As shown in the FIG. 3 frequency-hopping pattern, the carrier phase differences linearly decrease or increase. Accordingly, one can calculate the best line fit data using a "best-line-fit" technique with all the collected data, and then calculate the error to make a range to see how many measured data are "good" and "bad". "Good" data refers to those frequencies' phase differences are within expectations and can be used; "bad" data refers to those frequencies' phase differences are much different from what are expected and severely affected by multipath. The "bad" data are ignored, whereas the "good" data are used for data averaging to represent carrier phase differences. These carrier phase differences are then used to convert to time differences of arrival; the time differences of arrival are then converted to position coordinates for locating the transmitter in three-dimensional space.

When tracking the transmitter 20, the computer 40 computes a best-fit track of motion representing past movement of the transmitter and a predicted path based on that history. A new direction not on the predicted path may represent "bad" data as indicated above, or it may represent that the transmitter 20 has been suddenly moved in a new path (i.e., good data). Subsequently measured track positions on the frequency-hopping network verify that the path of transmitter 20 has changed or if a position measurement is aberrant (i.e., bad). If a position measurement is bad and the bad data is ignored, a representation of the track of the transmitter 20 is be "smoothed"—the point before and after the bad data is connected with a best line, continuous curve or best curve fit.

The frequency-hopping pattern disclosed above is a simple step pattern. However, the pattern could start at any point within the selected frequency of operation and step or hop from that point in any variation or sequence. The pattern of frequency hopping is not limited and is discretionary to the system designer.

Further, certain frequencies may be screened to improve system performance. For example, frequencies $f_{11}$ and $f_{23}$ may produce "bad" data, as described above, meaning that those frequencies may be severely affected by multipath or signal degradation. In this case, the frequency-hopping pattern may be modified to skip those frequencies. Another common cause of bad data, in addition to multipath signals, is interference from other devices. Such devices may be on a channel that resides within the frequency-hopping pattern. By hopping over the interfering channel, the interference can be avoided or minimized.

Determining a poor channel of operation (frequency) may occur during initial set-up or at any point during operation. One example of a problem arising during operation is another mobile transmitter being brought within range of the system and creating interfering RF signals on certain channel(s). In such situations where bad data is suspected there are multiple ways to determine is the channel is corrupted. For example, if the transmitter is set in a known position relative to the known positions of the receivers, each channel can be tested for accuracy of measurement. More dynamically, the system can monitor which channel produces bad data and if the same frequency repeatedly indicates false positions relative to other channels, that channel may be excluded. Alternatively, signal strength or indications of signal interference may be used to screen out certain channels.

At system start-up, the DDS signal source 22 can initiate a calibration routine to find and screen channels that provide poor transmission. The transmitter 20 and receiver network 14 may be coordinated to start on an "acquisition channel" in a variety of ways (designated acquisition channel, transmitter broadcasts on one channel while a receiver hops, a receiver sits on one channel waiting for the transmitter to hop through, or both a receiver and the transmitter hop, but at different rates so the receiver and the transmitter eventually connect). In such an embodiment, after the transmitter and receiver are synchronized, the microprocessor 24 in the transmitter 20, the central processing unit 30, and computer 40 coordinate to step through frequencies with the transmitter 20 at a stable location. If certain channels produce data outside an acceptable location range, those channels may be suffering from corruption, interference, or other problems, and use of those channels can be minimized or eliminated.

In one embodiment, the electromagnetic signal from transmitter 20 may conform to an 802.11 wireless Local Area Network (LAN) type protocol. In addition, the principles described herein extend to other RF protocols including, but not limited to, Bluetooth, ZigBee, and ultra-wideband (UWB). System tradeoffs mean that frequency and spectrum band width choices affect antenna size and that very high frequency systems result in signal propagation limitations. Provided the phase of the signal or time of arrival using UWB (Ultra-Wideband) narrow-pulse signals can be calculated, typical timing measurements, such as time of arrival or time difference of arrival, can be used as well as various protocols and signal wavelengths including, but not limited to Bluetooth, Wi-Fi, ultra wideband, and other frequency RF carrier signals. FSK, BPSK, QPSK or any other modulation scheme that provides phase information may be utilized.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. Such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. The computer readable medium may be a non-transitory computer readable storage medium, examples of which include, but are not limited to, an electronic, magnetic, optical, electromagnetic, infrared, or semiconductor system, apparatus, or device, or any suitable combination thereof.

As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium is not a computer readable propagating signal medium or a propagated signal.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, microwave or radio frequency (RF), or any suitable combination thereof.

The program code may execute entirely on a user's device, partly on the user's device, as a stand-alone software package, partly on the user's device and partly on a remote computer or entirely on a remote computer or server. Any such remote computer may be connected to the user's device through any type of network, including a local area network (LAN) or a wide area network (WAN), or the connection may be made to an external computer (for example, through the Internet using an Internet Service Provider).

Additionally, methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the proposed methods herein can be used to implement the principles of this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized.

While the aforementioned principles have been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this invention.

What is claimed is:

1. A system for tracking a position of a transmitter, the system comprising:
   the transmitter configured to transmit pulsed frequency-hopping electromagnetic signals and a reference signal, each frequency-hopping electromagnetic signal including a plurality of carrier signals at different frequencies;
   at least three receiver antennae configured to receive the frequency-hopping electromagnetic signals transmitted by the transmitter; and
   a central controller in communication with the transmitter and the at least three receiver antennae, the central controller being configured to acquire the reference signal from the transmitter, to acquire the frequency-hopping electromagnetic signals from the least three receiver antennae, to detect the carrier signals in the frequency-hopping electromagnetic signals, and to compute phase differences between the detected carrier signals and the reference signal, the central controller being further configured to calculate the position of the transmitter based on these computed phase differences.

2. The system of claim 1, wherein the central controller computes a best fit track of transmitter movement based on the computed phase differences using a best-line-fit technique.

3. The system of claim 2, wherein the central controller calculates an error range for the best fit track of the transmitter based on an expected linear progression of the phase differences, and if a transmitter position is identified by the central controller to be outside of the error range of the best fit track, the central controller either ignores the identified transmitter position or determines a new best fit track based on continued position tracking of the transmitter.

4. The system of claim 3, wherein if the central controller ignores the identified transmitter position, the central controller represents a track of the transmitter movement with a best-fit curve or line between a transmitter position determined before the identified transmitter position and a transmitter position determined after the identified transmitter position.

5. The system of claim 2, wherein if the identified a transmitter position is identified by the central controller to be outside of the error range of the best fit track on a given frequency, the transmitter and the at least three receivers at least temporarily stop using that given frequency.

6. The system of claim 1 wherein the central processing unit includes an analog to digital converter configured to digitize the computed phase differences to produce digital data representing the computer phase differences.

7. The system of claim 6 further comprising a computer system coupled to the central processing unit and configured to receive and convert the digital data representing the computer phase differences into time difference of arrival of the plurality of carrier signals of each frequency-hopping electromagnetic signal.

8. A system for tracking a position of a transmitter, the system comprising:
   a transmitter configured to transmit frequency-hopping electromagnetic signals, each frequency-hopping electromagnetic signal including a plurality of carrier signals at different frequencies;
   at least three receiver antennae configured to receive the frequency-hopping electromagnetic signals transmitted by the transmitter; and
   a central controller in communication with the at least three receiver antennae to acquire the frequency-hopping electromagnetic signals from the least three receiver antennae and to compute phase differences based on these frequency-hopping electromagnetic signals, the central controller further configured to i) calculate the position of the transmitter based on these computed phase differences, and to ii) perform a calibration routine that steps through frequencies with the transmitter whereby phase integrity of the electromagnetic signals is calibrated at a plurality of frequencies, and wherein the central controller and the transmitter use frequencies within a range determined by phase relationships of the plurality of frequencies, for position tracking calculations.

9. The system of claim 8, wherein the transmitter is positioned at a known location relative to the at least three receiver antennae, and the central controller compares an expected position of the transmitter based on the known location to the transmitter position calculated based on the computed phase differences.

10. The system of claim 8 wherein if one or more given frequencies in a frequency-hopping network fail to provide phase integrity to allow for tracking of the transmitter, the one or more given frequencies are eliminated from use by the transmitter and the at least three receiver antennae.

11. A method for setting up a system for tracking an RF transmitter, comprising:
   placing the RF transmitter in a fixed location;
   placing at least three receiver antennae in locations within RF signal range of the RF transmitter, the at least three receiver antennae being in communication with a CPU;
   establishing communication on a first frequency between the RF transmitter and at least one of the at least three receiver antennae and calculating a position of the RF transmitter relative to the at least one receiver antenna using phase data of signals transmitted by the RF transmitter;
   frequency hopping to at least one other frequency and calculating the position of the RF transmitter using the phase data of the signals transmitted by the RF transmitter relative to the at least one receiver antenna;
   determining a range of error for a position of the RF transmitter based on the fixed location and positions of the RF transmitter as calculated using other frequencies, other antennae data, or a combination of both other frequencies and other antennae data;

determining if the calculated positions of the RF transmitter based on the multiple frequencies are within the range of error; and determining a present position of the RF transmitter based on the calculated positions of the RF transmitter that are within the range of error.

12. The method of claim 11, further comprising:

establishing communication on the first frequency between the RF transmitter and a second of the at least three receiver antennae, and calculating a position of the RF transmitter relative to the second antenna using phase data of the signals transmitted by the RF transmitter;

frequency hopping to at least one other frequency and calculating the position of the RF transmitter using phase data of the signals transmitted from the RF transmitter relative to the second antenna of the at least three receiver antennae; and determining if the calculated locations of the RF transmitter on the multiple frequencies are acceptable for determining the present position of the RF transmitter.

13. The method of claim 12, further comprising comparing the position of the fixed RF transmitter as calculated using time of arrival data determined from the phase differences from the multiple frequency phase data from the transmitter to a first antenna of the at least three receiver antennae to data calculated using data from the second antenna of the at least three receiver antennae.

14. The method of claim 12, further comprising excluding from frequency hopping by the RF transmitter a frequency that produces a location of the RF transmitter outside the range of error for the position of the RF transmitter.

* * * * *

UNITED STATES PATENT AND TRADEMARK OFFICE
CERTIFICATE OF CORRECTION

PATENT NO.         : 9,933,509 B2
APPLICATION NO.    : 14/568390
DATED              : April 3, 2018
INVENTOR(S)        : Edward L. Hill et al.

It is certified that error appears in the above-identified patent and that said Letters Patent is hereby corrected as shown below:

In the Claims

Column 9, Line number 63, Claim 5, delete "the identified" following "wherein if".

Signed and Sealed this
Twenty-second Day of May, 2018

Andrei Iancu
*Director of the United States Patent and Trademark Office*